(12) United States Patent
Ouchi

(10) Patent No.: US 7,734,506 B2
(45) Date of Patent: Jun. 8, 2010

(54) CATALOG, CATALOG QUERY, AND ITEM IDENTIFIER FOR A PHYSICAL ITEM

(76) Inventor: Norman Ken Ouchi, 20248 View Crest Ct., San Jose, CA (US) 95120

( * ) Notice: Subject to any disclaimer, the term of this patent is extended or adjusted under 35 U.S.C. 154(b) by 1415 days.

(21) Appl. No.: 10/127,294

(22) Filed: Apr. 22, 2002

(65) Prior Publication Data

US 2003/0200155 A1  Oct. 23, 2003

(51) Int. Cl.
  G06Q 30/00  (2006.01)
  G06F 17/30  (2006.01)
(52) U.S. Cl. .......................... 705/26; 705/27
(58) Field of Classification Search .............. 705/1, 705/26–29
  See application file for complete search history.

(56) References Cited

U.S. PATENT DOCUMENTS

| | | | | |
|---|---|---|---|---|
| 4,750,113 | A | 6/1988 | Buggert | 710/64 |
| 5,231,566 | A * | 7/1993 | Blutinger et al. | 705/27 |
| 5,950,173 | A * | 9/1999 | Perkowski | 705/26 |
| 6,016,504 | A | 1/2000 | Arnold et al. | 709/200 |
| 6,023,683 | A | 2/2000 | Johnson et al. | 705/26 |
| 6,101,515 | A | 8/2000 | Wical et al. | 707/531 |
| 6,119,102 | A | 9/2000 | Rush et al. | 705/29 |
| 6,170,002 | B1 | 1/2001 | Ouchi | 709/206 |
| 6,292,707 | B1 | 9/2001 | Hair et al. | 700/97 |
| 6,292,894 | B1 | 9/2001 | Chipman et al. | 713/168 |
| 6,591,252 | B1 * | 7/2003 | Young | 705/67 |
| 2002/0139846 | A1 * | 10/2002 | Needham et al. | 235/383 |
| 2003/0018894 | A1 * | 1/2003 | Hall | 713/170 |
| 2004/0002371 | A1 * | 1/2004 | Paquin et al. | 463/17 |
| 2005/0020337 | A1 * | 1/2005 | Simmons | 463/11 |

OTHER PUBLICATIONS

"booksprint.com". Quinn, Mary Ellen. The Booklist. Chicago: Nov. 1, 2001. vol. 98, Iss. 5; p. 504 [recovered from Proquest database Aug. 17, 2006].*
"Using rFld to Track and Trace High value Products". Judith A Symonds, Auckland University of Technology, New Zealand. David Parry, Auckland University of Technology, New Zealand. Journal of Cases on Information Technology, vol. 10, Issue . 2008. [obtained from EIC search results on Jul. 14, 2009].*
"Automatic Identification and Data Capture Technologies". Robert Leibrandt. Logistics Spectrum; Oct.-Dec. 2007; 41, 4; Research Library p. 11 [obtained from EIC search results on Jul. 14, 2009].*
RosettaNet at RosettaNet.org Non-profit industry organization for standard use of XML Uniform Code Council at uc-council.org Non-profit industry organization for bar code standards, the Universal Product code, UPC; the Global Trade Item Number, GTIN; and the SSCC Serialized Shipping Container Code.

* cited by examiner

Primary Examiner—Jeffrey A. Smith
Assistant Examiner—William J. Allen

(57) ABSTRACT

This invention is related to electronic information transfer between trading partners and more particularly to the use of a physical item identifier affixed to a physical item for tracking the item using physical identification systems. The invention further discloses the catalogs, catalog queries and processes to provide the information to initialize the item in the physical identification systems.

In the present invention, a machine-readable item identifier is affixed to a physical item. The identifier is unique and is used to identify the item. The item identifier has three segments: 1) catalog identifier, 2) item description identifier, and 3) physical item identifier. The catalog identifier is used to determine the catalog that provides the item description and a description specific to the physical item. The item description identifier is used to query the catalog, which returns the description of the item. The physical item identifier is used to query the catalog, which returns a more detailed description of the physical item. The item identifier and the item description are used to initialize item in the physical identification system. The description specific to the item is added to the physical identification system and associated with the item identifier.

17 Claims, 2 Drawing Sheets

| Company Prefix | Item Reference Number | Check |
| 6-digits | 5-digits | digit |

UPC
Figure 1A

| Package level digit | Company Prefix & Item Reference Number 12-digits | Check digit |

GTIN
Figure 1B

| Package level digit | Company Prefix & Item Reference Number 12-digits | Check digit | Physical Item Number 7-digits |

Item Identifier
Figure 1C

CATALOG, CATALOG QUERY, AND ITEM IDENTIFIER FOR A PHYSICAL ITEM

CROSS-REFERENCE TO RELATED APPLICATIONS

Catalog and item Identifier for Configurable items
application Ser. No. 09/962,953; Ouchi, Norman Ken Catalog, Catalog Query, and item identifier for Configurable Items
Application submitted Mar. 11, 2002; Ouchi, Norman Ken

STATEMENT REGARDING FEDERALLY SPONSORED RESEARCH OR DEVELOPMENT

None

FIELD OF THE INVENTION

This invention is related to electronic information transfer between trading partners and more particularly to the use of a physical item identifier affixed to a physical item by the selling trading partner for tracking the item using the physical identification system of the buying trading partner. The invention further discloses the catalogs, catalog queries and processes to provide the information to initialize the item in the buyer's physical identification system.

BRIEF SUMMARY OF THE INVENTION

In the present invention, a machine-readable item identifier is affixed to a physical item. The identifier is unique and is used to identify the item. The item identifier has three segments: 1) catalog identifier, 2) item description identifier, and 3) physical item identifier. The catalog identifier is used to determine the catalog that provides the item description and a more detailed description of the physical item. The item description identifier is used to query the catalog, which returns the description of the item. The physical item identifier is used to query the catalog, which returns a description specific to the physical item. The description specific to an item is usually for configurable items. The item identifier and the item description are used to initialize the item in the physical identification system. The item identifier and the description specific to the item are added to the physical identification system. The control of the physical item may transfer to a second catalog. In this case, the first catalog provides a link to the second catalog so that the queries can be directed to the second catalog.

BACKGROUND OF THE INVENTION

Much of the recent advances in electronic commerce enable a first trading partner to order an item from a second trading partner and have high expectations that the correct item will be delivered. The Universal Product Code, UPC and its successor, the Global Trade Item Number, GTIN, with extensions disclosed in the referenced patent applications are used to identify an item and its configuration so the second trading partner will have an accurate description of the item ordered by the first trading partner. However, the physical item does not have a systematic identifier that can be used to track it through its life. The UPC or GTIN are not sufficient since there may be other items with the same description that have the same item description identifier. The publishing industry uses the International Standard Book Number, ISBN, to identify a book. A book is registered with the ISBN organization and assigned an ISBN. The ISBN of a book is encoded in a bar code that is printed on the book cover. The ISBN on a book can be used to query an ISBN catalog and the catalog will respond with the author and title of the book. The ISBN can be used to order the book, used with electronic point of sale equipment, etc. as the UPC is used in the grocery and other industries. However, the ISBN cannot be used to identify a specific physical book since all books with the same characteristics (title, author, etc.) have the same ISBN. A library that loans books cannot use the ISBN to track each book that is loaned out. (Unless it is a very small library and it has only one copy of a book.) The library must use another identifier for each physical book. This is usually an additional bar code that is unique for a book in a library and the system used to track the physical book. There is additional effort required to affix the bar code label and associate the bar code with the characteristics of the book in the library tracking system. Since there are no standards for these added bar codes, the bar codes used in a first library system will not have any meaning in a second library system. A book with a library bar code has no identification in any other system.

RosettaNet is an electronics industry consortium focused on defining and implementing standards for use of the Internet in commerce between trading partners. As part of the standards, the description for items, the catalog structure, and catalog queries have been defined and implementation started. In partnership with RosettaNet, the Uniform Code Council, UCC, is working to establish standards for the item description identifier, a part number, for the transactions between trading partners. The UCC is the standards body that defines and controls the standard for the UPC and GTIN and other associated identifiers. In this specification, a catalog is an organization of information that describes attributes of items in the catalog. One of the attributes is an item description identifier or part number. The catalog supports two classes of queries: 1) the first query class uses the description of an item as an argument and the catalog responds with the item description identifier, part number, if there is an item that fits the description and 2) the second query class uses the item description identifier, part number, as the argument and the catalog responds with the description of the item. RosettaNet is establishing standards for the electronics industry for item descriptions; web based, system accessible catalogs; and catalog queries. RosettaNet and the UCC are working to establish standards for the item description identifier, the part number.

The UPC is more complex than the ISBN in that the catalog with item descriptions is not a single catalog as with the ISBN but multiple catalogs where a company provides a catalog of the items it sells. The UCC assigns a range of UPC codes to a company by assigning some of the digits to identify the company and other digits are assigned by the company to identify the description of the item. For example, the UPC, Illustrated in FIG. 1A, is a 12-digit code that can be represented in a bar code. Six digits, called the Company Prefix, are assigned by the UCC and are associated with a company. Five digits, called the Item Reference Number, are assignable by the company to identify product descriptions. One digit is used as a Check Digit and is derived from the values of the other digits using an algorithm so that simple bar code reading errors can be detected. To determine the description of a box of soap from the UPC bar code on the box is a two-step process. The first step is to determine the company from which the UPC came. The UCC has a catalog of the six digit Company Prefix assignments. The UCC catalog is used to determine the company from which the UPC came. The second step is to determine the description of the box of soap from the company catalog. The UPC is used to query the catalog of the company that assigned the five-digit UPC range. The catalog query returns the item description. For the GTIN illustrated in FIG. 1B, the UCC uses a 12-digit field for the Company Prefix and Item Reference Number. The division of UCC assigned Company Prefix digits and the companies assigned Item Reference Number digits are not fixed. This permits better use of the combined 12-digit field since all companies do not need a five-digit Item Reference Number as in the UPC, which covers 100,000 different items, to assign to their products. The UCC has different divisions of the digits so that for example, a company with few items is assigned a GTIN with three-digit Item Reference Number field, which covers 1000 different items. The UCC then has nine Company Prefix digits to assign and can assign 1,000,000,000 companies a three-digit Item Reference Number GTIN code. As a consequence, the GTIN cannot be divided to determine the Company Prefix and the complete GTIN containing the Company Prefix and the Item Reference Number must be used to determine the company assigned the GTIN.

A manufacturer purchases components to assemble products. The components are packaged in a carrier that can hold a number of individual, identical components. The carrier is used to feed the components into the assembly equipment. When new, the carrier holds a specific number of components. As products are assembled, the components in the component carrier are consumed. The set of products to be assembled may complete before the carrier is empty. The carrier is returned to a storage location until needed to assemble the product needing the component. The UPC or GTIN associated with the component carrier cannot be used to identify the physical carrier since there may be other carriers with the same component and hence the same bar code. As with the library books, a second bar code may be affixed to track the physical carrier. As with the library and the ISBN, the bar code must be affixed and the corresponding information entered and cross-referenced with the bar code.

A configured product, for example, a PC can have specific configuration of functions when built and sold but changed by the owner when adding functions and removing other functions. When the PC is brought in for warranty repairs, the current configuration should be compared with the original configuration. To identify the specific physical PC, an additional bar code label is usually affixed to the unit. Like the bar code on the library book or the bar code on the component carrier, the bar code is specific to the organization that applied the bar code and the system that is used to track the bar code.

However, if the book is misplaced and later found in another library, the bar code is not of use to identify the original library. Other labels or a name stamped on the book must be used to identify the original library. If the PC is serviced by a third party service provider, the third party requires access to the PC manufacturer system and have compatible bar code equipment to obtain the configuration information. If the third party service provider provided repair service to a number of manufacturers, the service provider may require a number of bar code systems to access the different configuration systems.

The Uniform Code Council, UCC, is the organization responsible for the definition and application of the bar code standards used for grocery and other industries that use the UPC and GTIN. The UPC was highly successful in transforming the grocery industry with the application of the bar code to identify items so that the check out counter bar code reader can read the bar code, access the pricing database for the item price and the inventory database to decrease the store inventory by the items sold. The bar code was used to identify the description of the item but not the item itself. The UCC has recently defined the Serial Shipping Container Code, SSCC, which can be used as a "license plate" to identify a physical shipping container. The SSCC is an 18-digit code containing the Company Prefix of the company creating the SSCC. The container is filled with items and the information is stored in a database. A SSCC is created and used as the key to the information in the database. The SSCC is also encoded as an 18 character bar code and applied to the shipping container. The SSCC can be read and used to access the database to obtain the information about the contents of the shipping container. The SSCC is self-identifying in that six digit positions, the Company Prefix, are assigned by the UCC, like the UPC and GTIN, to encode the owner of the SSCC. The owner of the SSCC assigns eleven digit positions and one digit is a check digit. Like the license plate on an automobile, each is unique and can be used to access information associated with the specific automobile. The license plate for an automobile is self-identifying. The number on the license plate does not identify the state that issued the license plate but the state name, color and picture on the license plate identifies the issuing state. Note that each state uses a sequence of letters and digits. Each combination is unique within a state's license plates. However, the number and letters from the license plate of one state may be used by a second state for a different automobile. The number from the first state identifies a specific automobile in the first state database. If used in another state, the number may not identify a physical automobile or certainly a different automobile. The SSCC is self-identifying and identifies a specific physical item. But the SSCC does not identify the item as the UPC or GTIN does. The SSCC is a second bar code and the item description identifier and the physical item identifier must be associated as with the second bar code on the book, or carrier, or PC.

Physical identification systems are used to support processes such as asset tracking, inventory tracking, configuration tracking, location tracking, item condition, etc. The physical identification systems require information describing the physical item and the unique identifier affixed to the item. The information associated with the item is available but not tied to a unique identifier nor accessible in a systematic process. What is desired is a single identifier, usually a bar code, affixed by the manufacturer, the selling trading partner, that can be used to identify the item and access the information associated with the item created and provided by the selling partner and a systematic process for the buying partner to access the information so that it can be used to initialize the item in the buyer's physical identification systems.

BRIEF DESCRIPTION OF THE DRAWINGS

FIG. 1A illustrates the division of digits in the Universal Product Code, UPC.

FIG. 1B illustrates the division of digits in the Global Trade Item Number, GTIN.

FIG. 1C illustrates the division of digits in an Item Identifier based on the GTIN.

DESCRIPTION OF THE INVENTION

Figure 2:
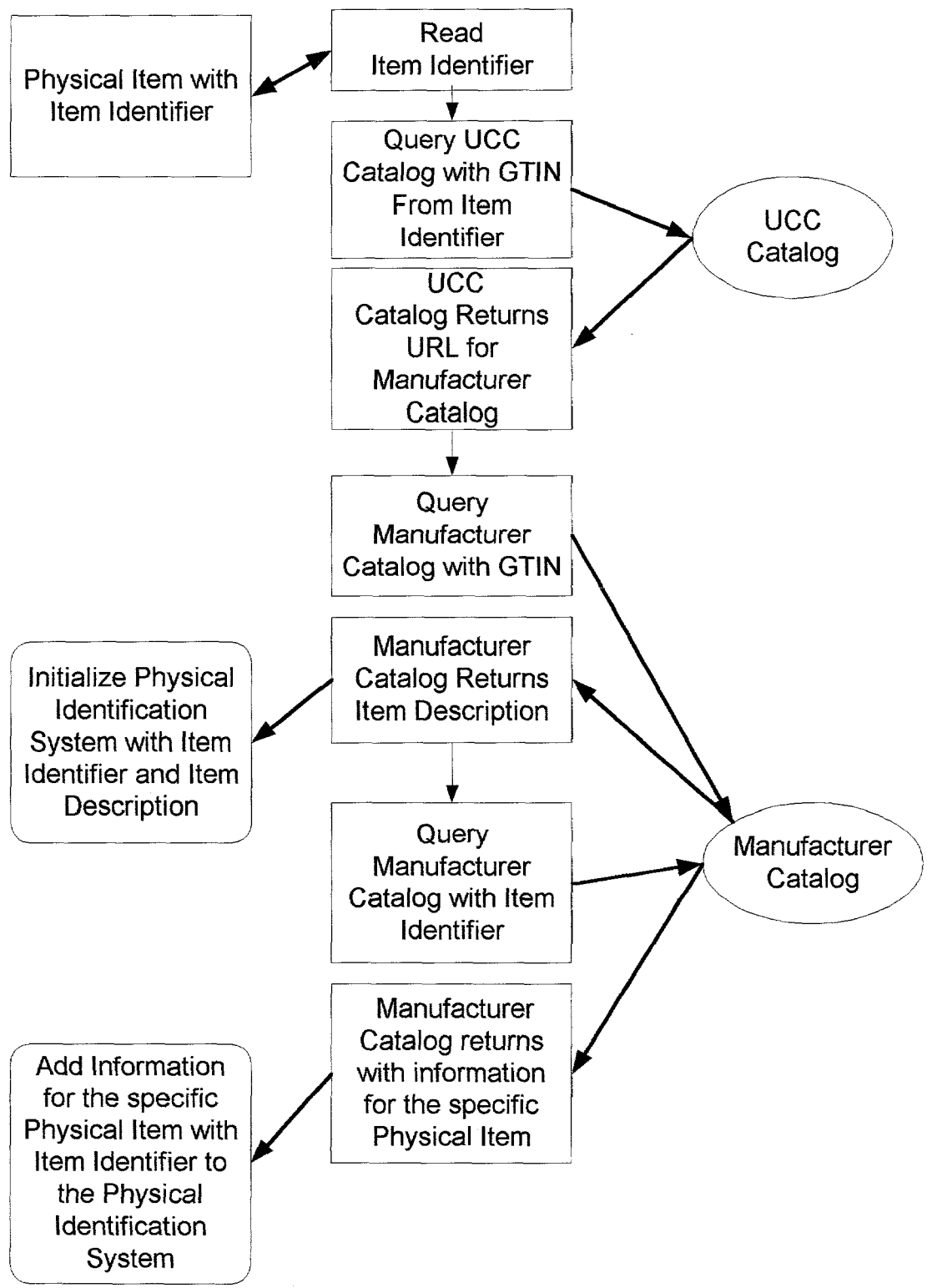
FIG. 2 illustrates the process for a buyer system to initialize a Physical Identification System.

In the present invention, a machine-readable item identifier, usually a bar code, is affixed to a physical item. The item identifier is unique and identifies that physical item as distinct from other items with the same description. The identifier has three segments: 1) catalog identifier, 2) item description identifier, and 3) physical item identifier. The catalog identifier is used to determine the catalog that provides the item description and a more detailed description of the physical item. The item description identifier is used to query the catalog, which returns the description of the item. The item description identifier and physical item identifier are used to query the catalog, which returns a more detailed description of the physical item. As an example, the UCC GTIN elements will be used to describe the item identifier. The GTIN consists of a Company Prefix, an Item Reference Number, and a Check Digit. (A Packaging level digit is also part of the GTIN but is ignored in this discussion. Assume that the Packaging level digit is 0.) The GTIN is used to identify the description of the item but not the item itself. All items with the same description have the same GTIN. The physical item identifier, illustrated in FIG. 1C, has in addition a Physical Item Number. The Physical Item Number is a set of digits, for this example, seven digits that are assigned to an item as a license plate. Six of the digits are used to create Physical Item Numbers so that each item has a unique number. The seventh digit is computed so that the Physical Item Number has a zero contribution to the GTIN Check Digit. That is, a GTIN with the Company Prefix and Item Reference Number has a Check Digit that is computed using an algorithm based on the values of the other digits in the GTIN. When the Physical Item Number is appended to the GTIN and the Check Digit algorithm is computed with the values of all of the other digits including the Physical Item Number, the Check Digit value is the same as the Check Digit value without the Physical Item Number. The Physical Item Number was defined in this manner so that the GTIN can be separated from the Physical Item Number and used as a GTIN without alteration. The result is that the item identifier is unique to an item.

The Company Prefix identifies the company to which the GTIN was assigned and thus, the catalog that cross-references the Item Reference Number to the item description. The Company Prefix serves as the catalog identifier. The Item Reference Number servers as the item description identifier. The Physical Item Number identifies a specific item with that GTIN. The Physical Item Number serves as the physical item identifier.

The item identifier provides a systematic process to identify the catalog associated with the item identifier and from the catalog the item description and additional item information for that specific physical item. Given an item identifier, the GTIN segment in the item identifier is used to access the UCC catalog to determine the owner of the GTIN and the Uniform Resource Locator, URL, of the catalog. Because the division of the Company Prefix and the Item Reference Number cannot be determined by inspection of a GTIN, the complete GTIN must be sent in the query of the UCC catalog. However, the UCC catalog determines the company assigned the GTIN using the Company Prefix digits. The company catalog also requires that the complete GTIN be in the query but the Item Reference Number is used to determine the item description since the Company Prefix is common to all of the GTIN. If a company has more than one GTIN ranges, each with a different Company Prefix, then the Company Prefix is required. However, each Company Prefix can be though of as having a separate logical catalog where the Item Reference Number is the distinguishing identifier within the logical catalog. Thus, the Company Prefix still serves as the catalog identifier and the Item Reference Number still servers as the item description identifier. The GTIN is used to query the catalog to determine the description of the item. The complete item identifier can be used to query the catalog to determine additional information, such as item configuration, associated with that specific item. The item identifier and the item description are used to initialize the item in the physical identification systems. The additional information is also used in the physical identification system specific to the physical item.

The process to initialize a physical identification system is illustrated in FIG. 2. The manufacturer of an item affixes the item identifier to the item as part of the manufacturing process. The buyer system reads the item identifier and extracts the GTIN. The buyer system determines the manufacturer catalog by querying the UCC web site with the GTIN to obtain the company to whom the GTIN was assigned. The UCC web site may be augmented to provide the Uniform Resource Locator, URL, of the manufacturer catalog. The manufacturer has a catalog connected to a network, the Internet, that responds to queries with the GTIN of an item with the description of the item. The manufacturer may have additional information associated with the specific item. The configuration of the functions or features of the item is an example. The catalog responds to queries that include the physical item identifier with the additional information for the specific item. The buying partner's system queries the manufacturer catalog with the GTIN to obtain the item description. The buyer system uses the item identifier and the item description to initialize the buyer's physical identification system. The buyer system uses the physical item identifier to query the manufacturer catalog to obtain the additional information for the specific item if provided by the manufacturer catalog. The buyer's physical identification system is be initialized with the additional information such as the function configuration for the item with the item identifier. Not all items are individually configurable so there may not be additional information. This completes the initialization of the physical identification system.

A company manufacturing components for product assemblers can label the component carriers with an item identifier. The components have a GTIN that can be used to order a carrier containing a number of components and the manufacturer has a catalog with the description of the item (the carrier with components) and the associated GTIN. The item identifier is usually a bar code with the GTIN and the Physical Item Number that is unique for each physical carrier. Thus, each carrier has a unique identifier that can be use by the customer to track the number of unused components remaining in the carrier. The customer receives the physical carrier and reads the item identifier, the bar code. The customer's system extracts the GTIN from the item identifier and queries the UCC web site with the GTIN. The UCC web site returns with the Uniform Resource Locator, URL, of the web site of the manufacturing company that created the GTIN. The customer system uses the URL to query the manufacturer web site with the GTIN and the web site catalog returns the description of the components in the carrier and the number of components in the carrier when shipped. The customer system creates an entry in the customer inventory system and other physical identification system with the description of the item, the quantity in the carrier, and the complete item identifier bar code. A single physical action, reading the bar code on the component carrier, has established the physical identification of the carrier in the customer physical identification systems. When the carrier is used, the item identifier bar code is read to identify the carrier used in the assembly process. When the process has completed, the number of components used are subtracted from the number of items in the carrier at the beginning of the assembly process and the count of the remaining components is stored in the inventory system or other physical identification system.

A PC manufacturer assembles a PC with a configuration of functions. Each PC with the same GTIN may have a different configuration of functions. The PC has a GTIN that is used to order the base PC and the catalog provides means to order a configuration of functions as requested by the customer. The PC manufacturer assigns an item identifier to the PC and creates a catalog entry with the item identifier as the key and the configuration as the information that further describes that specific PC. The item identifier is encoded as a bar code and affixed to the PC. When the customer receives the PC, the customer can read the bar code and using a process similar to the process used by the customer of the component manufacturer, the customer can establish a record in the customer physical identification systems such as the inventory system for the PC including the configuration of functions. Since the item identifier is unique and associated with that PC, the item identifier bar code can be used for physical identification and tracking by the customer; an additional bar code is not required and the additional effort to associate the PC to the additional bar code is avoided. When the PC is repaired under warranty, the repair service provider can read the item identifier bar code and the repair service provider system can separate the GTIN and use the GTIN to query the UCC web site to obtain the URL of the PC manufacturer. The system then queries the PC manufacturer catalog with the item identifier to obtain the configuration of the PC when built. The single bar code read can provide access to the information related to the physical item with the item identifier bar code.

The changes to the configuration and repairs to the PC can be recorded in the information associated with the item identifier in the PC manufacturer catalog. The current configuration, repair history, and other information for that PC are located in one catalog. However, the PC manufacturer may not want to be responsible for the life of the PC and may want to provide a link to the catalog of the customer to whom the PC was sold or to the catalog of a third party service provider. In this case, the system reading the bar code, would first determine the manufacturer's catalog using the GTIN and the UCC catalog and then use the item identifier to query the manufacturer's catalog. The manufacturer's catalog may provide the configuration when the PC was built and the URL of the catalog that has the more current information on the specific PC. Using the URL, the system then queries the second catalog with the item identifier to determine the more current information on the specific PC.

The ISBN has a single catalog and a number of third parties host web sites with copies of the ISBN catalog. An item identifier for a book is the ISBN and the Physical Item Number where the ISBN servers as the catalog identifier and the item description identifier. A book publisher applies for an ISBN for a new book as is done today. When the book is printed, each book cover is printed with a bar code that has the ISBN and a unique Physical Item Number. The first book has the Physical Item Number "000000", the second has "000001", etc. Each book will have a unique identifier. If the standard for Physical Item Number is set at seven digits, six digits used for labeling each item and a digit used to compensate for the ISBN check digit, a million copies can be published for a given ISBN. If more that a million copies are published, a second ISBN must be used. In the past, the printing technology could not tailor each copy of a book. However, the current printing technology can economically print small differences in mass printed material. Magazines print the address of mail recipients right on the cover. A unique bar code can be printed on each book cover. Printing a bar code on an item is the same as affixing a bar code to an item.

A library receiving a new book can read the bar code on the book cover. The library system separates the ISBN in the item identifier and query an ISBN web site catalog to determine the title, author, publisher, etc. of the book and create an entry for the book (using the book description and item identifier bar code) in the library book tracking system, the physical identification system for the library. With the single bar code read, the book is ready to be loaned. The library system has a unique identifier for the book and has the information about the book in the library system. Additional information such as condition of the book, location in the shelves, etc. can be associated with the item identifier. Schools can use this for assigning books to students. A book buyer with a large collection can use the same process to catalog the buyer's library of books. Kids can keep track of the books they loan to friends.

The item identifier is a machine-readable identifier affixed to a physical item to uniquely identify and distinguish the item. Using the item identifier, catalogs can be queried to determine the characteristics of the item. A system can use the elements of the item identifier to query the appropriate catalogs and obtain information about the item so that the system can create the information in the physical identification system required to use and track the physical item.

DESCRIPTION of a PREFERRED EMBODIMENT

The catalog functions and buyer's system are implemented as software programs written in Java, C++, Microsoft Visual Basic, or a number of programming languages. The programs may use a database for storing the item information, translation tables and other information. Database programs are available from Oracle, IBM, Microsoft, and many other providers. These programs and databases execute in computers manufactured by, for example, IBM, Sun, Dell, and Compaq. The computers may be, for example, PC's, workstations, mainframes, and hand-held computers. The computers may have an operating system such as UNIX, LINUX, Microsoft 2000, and IBM OS/9000. The computers are connected to a network that may be, for example, a LAN, WAN, Internet, Intranet, wireless LAN, or wireless Internet. The forms of communications between two systems connected by a network are defined by standards. The data structures for queries and responses are formulated by standards such as those defined and implemented by organization like RosettaNet. The definition of the item identifier, the GTIN, the ISBN, are defined and implemented by standards organization like the UCC and ISBN. A wide variety of bar code printing and reading equipment suppliers are available and are guided by standards from organizations like the UCC and ISBN.

As an example, the item identifier consists of a fourteen-digit GTIN and seven-digit Physical Item Number and is encoded as a bar code. The manufacturer of an item applies to the UCC for a GTIN range where the UCC determines the Company Prefix digits. The manufacturer sets the Item Reference Number digits for the items that are manufactured to an item description. The manufacturer generates a different physical item identifier, Physical Item Number, for each item with the same item description, concatenates the GTIN and Physical Item Number to form an item identifier and affixes the item identifier to an item. The manufacturer has a catalog that responds to queries with a GTIN with the description of the item that has that GTIN. If the item is configurable, the manufacturer adds the item configuration information to the catalog using the Physical Item Number as the key. The complete key may be the GTIN combined with the Physical Item Number, the complete item identifier. The buyer's system to process the item identifier has a bar code reader, an Internet connection and a program. The program accepts an item identifier as read by the bar code reader and checks that the bar code has the correct number of digits for an item identifier and that the check digit is correct. The program extracts the GTIN from the item identifier and queries the UCC web catalog using the GTIN as the search argument. The UCC catalog responds with the URL of the catalog associated with the GTIN. Using the URL, the program queries the catalog using the GTIN. The catalog responds with the item description. The program uses the item description and the item identifier to create the internal information to describe the item in the internal physical identification systems. If the item is a configured item, the program queries the catalog with the item identifier and the catalog responds with the configuration and other information for the specific item. The program uses the item configuration and other information for the specific item to create the internal information in the internal physical identification systems.

Note that if the item identifier uses the GTIN or ISBN, the GTIN or ISBN can be used by truncating the item identifier so that the GTIN or ISBN remains. The truncation can be done in the bar code reader, the system receiving the bar code, or other processes that receive the item identifier. The GTIN or ISBN can then be used by systems that use the GTIN or ISBN for point of sales, inventory counting, etc.

I claim:

1. A method to initialize a physical item identification system with one read of a self identifying unique machine readable item identifier, the method being applied to a physical identification system including a first and second catalog connected over a network, the first catalog capable of accepting a query with a catalog identifier for the second catalog, the second catalog capable of accepting a query with an item description identifier for the item description the method comprising:
   providing a physical item with a self identifying unique machine readable item identifier, the machine readable identifier being unique from other identifiers within the physical identification system, the machine readable item identifier provided by the provider of the second catalog; and, comprising three segments read in a single scan, the segments including:
      a catalog identifier specifying the second catalog containing the description of the physical item;
      an item description identifier that is unique within the second catalog specifying the description of the physical item in the second catalog; and
      a physical item identifier that is unique for each physical item that share the same catalog identifier and item description identifier;
   reading the machine readable item identifier utilizing a single scan;
   in response to reading the machine readable item identifier utilizing a single scan:
      querying the first catalog with the catalog identifier from the machine readable item identifier;
      receiving the identity of the second catalog in response to the query of the first catalog;
      querying the second catalog with the item description identifier from the machine readable item identifier;
      receiving the description of the item in response to the query of the second catalog;
      querying the second catalog with the physical item identifier from the machine readable item identifier;
      receiving data specific to the physical item in response to the query of the second catalog using the physical item identifier;
      initializing the physical identification system with the machine readable item identifier, the description of the item and the data specific to the physical item.

2. The method of claim 1, wherein the second catalog further provides a query with the item description identifier and physical item identifier and responds with information specific to the physical item, such that the physical identification system is further initialized to associate the information specific to the physical item with the machine readable item identifier.

3. The method of claim 1, wherein a default catalog is defined as the second catalog and the first catalog is not queried or required and the catalog identifier is not required in the machine readable item identifier.

4. The method of claim 1, wherein the unique three part machine readable item identifier is encoded as a bar code or other machine-readable or machine sensed device.

5. The method of claim 1, wherein the catalog identifier and item description identifier of the unique three part machine readable item identifier are provided a check digit such that these two segments may be determined to be read correctly without reading the complete item identifier.

6. The method of claim 1, wherein the second catalog further responds to a query including the item description identifier and the physical item identifier with the identity of a third catalog such that the third catalog is queried with the item description identifier and the physical item identifier and the third catalog responds with information specific to the physical item to initialize the physical item identification system to associate the information specific to the item with the physical item with the machine readable item identifier.

7. The method of claim 1 wherein the second catalog further provides access with the item description identifier and physical item identifier to add or update and save the item information specific to the physical item such that the item information specific to the item associated with the machine readable item identifier is added or updated and saved in the second catalog.

8. A method to initialize a physical item identification system with one read of a self identifying unique machine readable item identifier, the method applied to a physical identification system including a first and second catalog connected over a network, the first catalog capable of accepting a query with a catalog identifier for the second catalog, the second catalog capable of accepting a query with an item description identifier for the item description the method comprising:
   providing a physical item with a self identifying unique machine readable item identifier, the machine readable identifier unique from other identifiers of the physical identification system; the machine readable item identifier provided by the provider of the second catalog; and, the machine readable item identifier comprising three segments read in a single scan, the segments including:
      a catalog identifier that is unique within the first catalog specifying the description of the physical item in the second catalog;
      an item description identifier that is unique within the second catalog specifying the description of the physical item in the second catalog; and a physical item identifier that is unique for each physical item that share the same catalog identifier and item description identifier;

reading the machine readable item identifier in one read;

in response to reading the machine readable item identifier in one read:

querying the first catalog with the catalog identifier from the machine readable identifier;

receiving the identity of the second catalog in response to the query of the first catalog;

querying the second catalog with the item description identifier and physical item identifier from the machine readable item identifier;

receiving the item description and item specific data in response to the query of the second catalog; and initializing the physical identification system with the machine readable item identifier, the description of the item and the item specific data.

9. The method of claim 8 wherein the catalog identifier and the item description identifier of the unique three part machine readable item identifier provides a check digit such that the catalog identifier and the item description identifier can be determined to be read correctly without reading the complete item identifier.

10. The method of claim 8 wherein a default catalog is the second catalog, the first catalog is not queried or required, and the catalog identifier in the machine readable item identifier is not required.

11. The method of claim 8 and a third catalog wherein the second catalog is further capable of accepting a query including an item description identifier and physical item identifier; and responding with the identity of the third catalog containing the item description specific to the item and the method further:

queries the second catalog including the item description identifier and physical item identifier;

receives from the second catalog the identity of the third catalog;

queries the third catalog including the description identity and the physical item identifier to determine item information specific to the physical item; and initializes the physical identification system with the item information specific to the physical item and associates the information with the machine readable item identifier.

12. The method of claim 8 wherein the catalog identifier and the item description identifier of the unique three part machine readable item identifier includes the Universal Product Code, UPC; or Global Trade Identification Number, GTIN; or the International Standard Book Number, ISBN or their successors.

13. The method of claim 8 wherein the second catalog means further provides access with the description identifier and physical identifier to add or update and save the information specific to a physical item such that the information specific to the item is added or updated and saved in the second catalog and accessed with the description identifier and physical identifier.

14. The method of claim 8, wherein the machine readable item identifier is encoded as a bar code or other machine-readable or machine sensed device.

15. A method to initialize a physical item identification system with information specific to a physical item by one reading of a self identifying unique item identifier, the method applied to a physical identification system including a first, a second catalog, and a third catalog connected over a network, the first catalog capable of accepting a query with a catalog identifier for the second catalog, the second catalog capable of accepting a query for a physical item description and the third catalog, the third catalog capable of accepting a query for item specific data, the method comprising:

providing a physical item with a self identifying unique machine readable item identifier, the machine readable item identifier being unique from other physical item identifiers of the physical identification system; the machine readable item identifier provided by the provider of the second catalog; and the physical item identifier comprising three segments read in a single scan, the segments including:

a catalog identifier that is unique within the first catalog specifying the second catalog containing the description of the physical item, an item description identifier that is unique within the second catalog specifying the description of the physical item in the second catalog, and a physical item identifier to uniquely identify and distinguish the physical item from other physical items that share the same catalog identifier and item description identifier;

reading the machine readable item identifier utilizing one read;

in response to reading the machine readable item identifier utilizing one read:

querying the first catalog including the catalog identifier from the machine readable item identifier;

receiving the identity of the second catalog in response to the query of the first catalog;

querying the second catalog including the item description identifier and physical item identifier from the machine readable item identifier;

receiving the item description and a third catalog identifier in response to the query of the second catalog;

querying the third catalog including the item description identifier and physical item identifier from the machine readable item identifier;

receiving information specific to the physical item in response to the query of the third catalog; and initializing the physical identification system with the machine readable item identifier, the item description and the information specific to the physical item.

16. The method of claim 15 wherein a default catalog is provided as the second catalog, the first catalog is not queried or required, and the catalog identifier is not required.

17. The method of claim 15, wherein the machine readable item identifier is provided a check digit where the catalog identifier and the item description identifier are independently protected from the physical item identifier such that the catalog identifier and the item description identifier can be determined to be read correctly separate from reading the complete machine readable item identifier.

* * * * *